United States Patent Office 3,672,880
Patented June 27, 1972

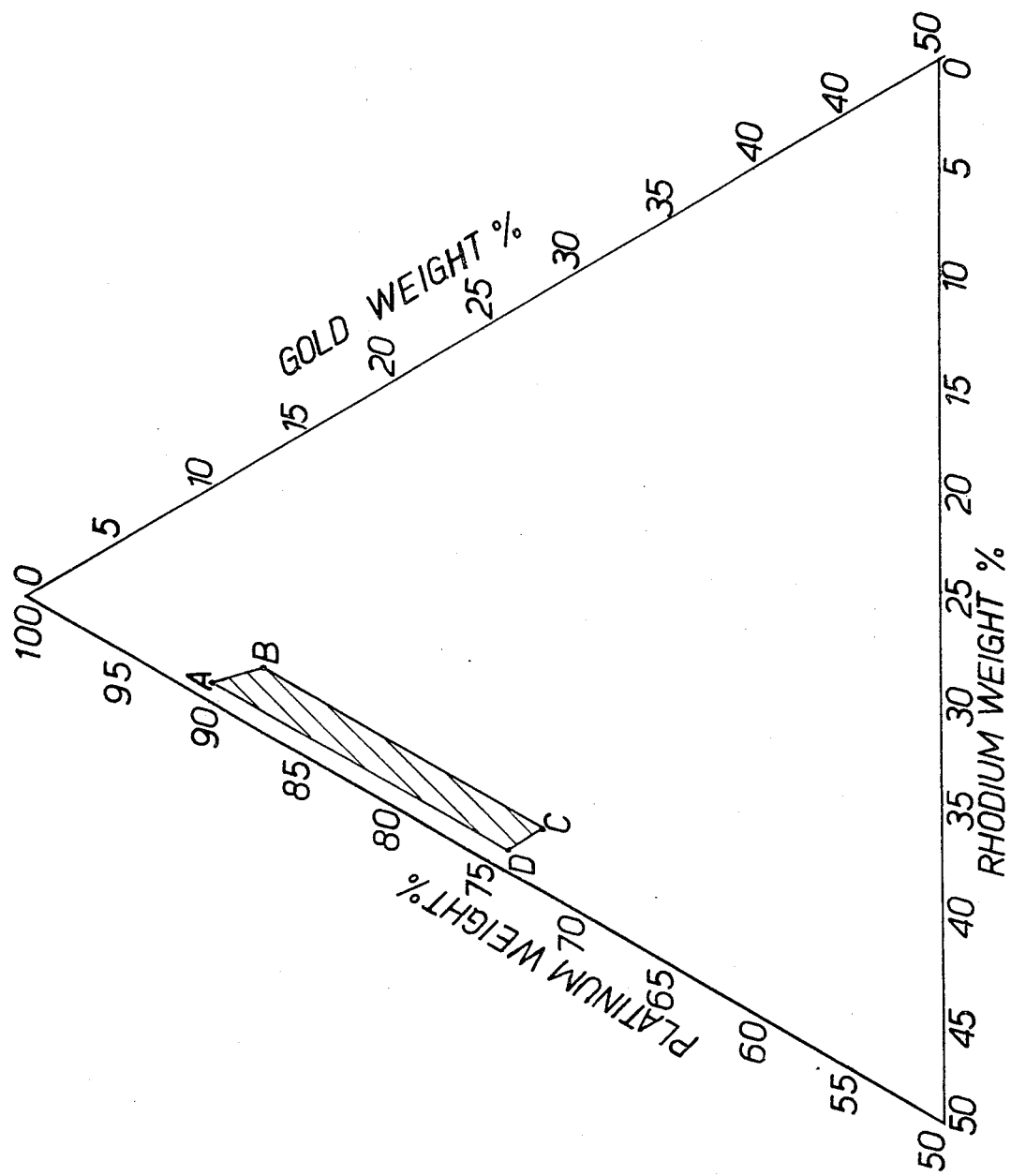

3,672,880
PLATINUM-RHODIUM-GOLD ALLOYS
Alan Sydney Darling and Gordon Leslie Selman, London, England, assignors to Johnson, Matthew & Co., Limited, London, England
Continuation-in-part of application Ser. No. 750,641, Aug. 6, 1968, which is a continuation of application Ser. No. 558,398, June 17, 1966. This application Feb. 20, 1970, Ser. No. 12,919
Claims priority, application Great Britain, June 19, 1965, 26,028/65
Int. Cl. C22c 5/00
U.S. Cl. 75—172                                 2 Claims

ABSTRACT OF THE DISCLOSURE

A method for melting glass which includes introducing glass into a container formed of an alloy consisting of 72–90% by weight of platinum, 9–25% by weight of rhodium and 1–3% by weight of gold. Thereafter, the glass in the container is subjected to a glass melting temperature. Further molten glass can be dispensed by expelling the same through the orifice of a member made of the alloy defined above.

This application is a continuation-in-part of application Ser. No. 750,641, filed Aug. 6, 1968, now abandoned, which was a continuation of application Ser. No. 558,398, filed June 17, 1966, now abandoned.

This invention relates to platinum-rhodium-gold alloys. The alloys of the present invention are particularly suitable for use in contact with molten glass and the present invention also relates to the manufacture of continuous glass fibres and to an improved fibre made of glass using such alloys.

Ser. No. 750,641, discloses a platinum-rhodium-gold alloy, for use in contact with molten glass and containing apart from impurities, 65–97% by weight of platinum, 2–25% by weight of rhodium and 1–10% by weight of gold.

These alloys facilitate the industrial handling of molten glass as they are less readily wetted by soda glass and borosilicate glass than pure platinum or the rhodium platinum alloys which are generally employed. It has hitherto been accepted that the fabrication procedures required for these gold bearing alloys are much more complex than those needed for the binary rhodium-platinum alloys.

In the glass making industry a common method of manufacturer of glass fibres or continuous filament involves the use of a series of spinning jets or nozzles mounted in the base plate of a spinning box or "bushing" containing the molten glass. The working temperature of the jets is commonly 1200° C., 1400° C. or more.

The quality of the glass filament produced depends to a large degree on the extent to which the molten glass "wets" or adheres to the alloy from which the jets or nozzles are made. This wetting or adhesion property is related in the inverse sense to the equilibrium contact angle which the molten glass makes with the alloy and a large contact angle indicates a lower degree of wetting.

If the contact angle is too low, there is a tendency for the molten glass to creep or spread around the edge of the jet rather than to emerge directly as a precise filament with no surface imperfections. A high degree of wetting also produces the phenomenon of glass creeping back from the spinning orifice across the outside surface of the base plate. This causes the extruded glass to coalesce and thus prevent fibre formation. It is an object of the present invention to reduce such a phenomenon in the manufacture of glass fibre.

Whereas reduced wettability is therefore desirable as a method of obtaining improved spinning characteristics this improvement should not be obtained by reducing the high temperature strength of the platinum alloy employed.

Although jets or nozzles for use in the spinning of glass fibre and fabricated from the alloys described and claimed in our co-pending application Ser. No. 750,641 are satisfactory, we have now found that manufacture of such jets or nozzles from these particular alloys is difficult and an expensive operation from the standpoint of both fabrication of the alloy and fabrication of the jets from the alloy. Further, the jets utilize large quantities of precious metal and are of such a size that the number which can be accommodated in the base plate of a bushing is limited. The number of filaments spun from such a plate is also correspondingly limited and it is a further object of this invention to provide an improved method of manufacture of glass fibre of an improved quality.

According to this invention a platinum-rhodium-gold alloy suitable for use in connection with molten glass, containing 9 to 25 weight percent rhodium, 1 to 3 weight percent gold and balance, apart from impurities platinum.

The invention also includes a method of melting glass comprising introducing glass into a container at least a part of which is formed from an alloy containing 9 to 25 weight percent rhodium, 1 to 3 weight percent gold and balance, apart from impurities platinum, and heating the container to melt the glass. Preferably the container includes a bushing plate made from the said alloy and having formed therein a plurality of spaced perforations for emergence of the molten glass to produce filaments.

The invention therefore also includes a flat apertured bushing plate made from an alloy containing, apart from impurities, 2 to 25 weight percent rhodium, 1 to 3 weight percent gold and balance platinum, and having formed therein a plurality of closely spaced perforations for the emergence of the filament.

We have found that such bushing plates are sufficiently strong and durable to withstand the arduous conditions of stress and temperature encountered in the manufacture of glass fibre for relatively long periods. The perforations may be made by any of the usual techniques for this operation: broaching, punching, drilling etc.

Such bushing plates, without jets or nozzles, are also more economic in that they utilise less precious metal alloy than the jets or nozzles used hitherto and produce a larger number of usable filaments per unit weight of metal than before.

Although the non-wetting characteristics such as contact angle continue to improve by increasing the gold content beyond 3 weight percent we have found that on doing so serious difficulties in the actual formation of alloys containing such quantities of gold arise.

Alloys having 4% by weight gold, or more, have a strong tendency to crack when hot formed and also during thermal cycling. Such cracks have been found to be intercrystalline cracks, which indicates the existence of at least two distinct phases, each containing gold, rhodium and platinum and that each phase possesses different qualities. The presence of such intercrystalline cracks leads not only to a shortened working life of components made from the alloys but also to difficulties in their fabrication. Moreover, it is common practice to subject such alloys to thermal cycling in an attempt to produce an homogenous alloy but, in the case of alloys containing at least 4 weight percent gold this treatment is ineffective. Cracking also occurs in welded joints formed between bushing plates made from such alloys and container walls made from platinum alloys containing 10% by weight rhodium. Further, alloys containing up to 3 weight percent gold are platinum. In use as a spinnerette such an alloy is subject to temperatures of the order of 1000° C. less than those used in the manufacture of glass fibre, also the perforated bushing plate remains stationary. The temperature conditions under which glass fibres are made are therefore considerably higher than those under which synthetic fibres are spun and, consequently, the thermal stresses encountered by the alloys used more severe.

After considerable periods of continual service, we have found that there is a tendency for glass filaments to deteriorate slightly. Our investigations indicate that, at this high temperature gold is lost to the atmosphere and that the passage of molten glass through the perforations of a bushing plate causes gold to be leached from the alloy to a depth in the region of 100 microns. Moreover, our tests have shown that up to 50 percent of the gold present in the surface layer of 100 microns may be leached and that it is this reduced quantity of gold which is a contributory factor in the deterioration of the glass filaments.

According to a further aspect of this invention there is, therefore, provided a method of melting glass comprising introducing glass into a container at least part of which is formed from an alloy containing 9 to 25 weight percent rhodium, 1 to 3 weight percent gold and balance apart from impurities, platinum, heating the container to melt the glass, and periodically annealing the container in contact with non-flowing glass at a temperature within the range of 1000–1500° C., and preferably 1300–1500° C. The periodic annealing serves to homogenise the alloy and reintroduce into the gold-depleted surface-layer additional gold from the remaining parts of the alloy.

The invention also includes glass fibre or filament when made in accordance with any of the above methods.

ALLOY PREPARATION

The alloys of the present invention are represented graphically in the accompanying drawing (using triangular coordinates) by an area ABCDA. In the accompanying drawing, the triangular coordinates of the points ABCD are set out in the following table:

TABLE I

|   | Pt | Rh | Au |
|---|----|----|----|
| A | 90 | 9  | 1  |
| B | 88 | 9  | 3  |
| C | 72 | 25 | 3  |
| D | 74 | 25 | 1  |

The composition of specific alloys in accordance with this invention are set out below:

| Pt | Rh | Au |
|----|----|----|
| 72 | 25 | 3  |
| 82 | 15 | 3  |
| 85 | 12 | 3  |
| 87 | 10 | 3  |
| 73 | 25 | 2  |
| 88 | 10 | 2  |
| 85 | 14 | 1  |
| 89 | 10 | 1  |

The presence of gold in these alloys hardens and strengthens them without detracting from their corrosion resistance.

The alloys are therefore also extremely suitable as slide wire materials and potentiometer windings and electrical contacts.

Comparison tests showing the improved wetting resistance of the above alloys as compared with that of pure platinum and 10 and 25% rhodium-platinum alloys are given in Table II.

The glass used was a low alkali calcium-alumino-borosilicate glass made by Pilkington Bros. Ltd. of Great Britain and known as E.621.

"Resistance in wetting" is directly related to the magnitude of the observed angle of contact between a drop of molten glass and a horizontal solid surface on which the drop is resting in equilibrium.

The equilibrium contact angles were measured at temperatures within the range 1100° C.–1500° C. (It does not follow, however, that the lower of the two angles, in any of the ranges given, corresponds to the lower temperature in the range, or the higher angle to the higher temperature.)

TABLE II

| Material | | | Equilibrium contact angles of E.621 within the temperature range 1,100°–1,500° C. | |
|----------|---|---|---|---|
| Platinum | Rhodium | Gold | | |
| 100 | 0  | 0 |     |     |
| 90  | 10 | 0 | 32  | 45° |
| 75  | 25 | 0 | 31  | 35° |
| 89  | 10 | 1 | 40  | 45° |
| 85  | 14 | 1 | 45  | 50° |
| 73  | 25 | 2 | 45  | 50° |
| 88  | 10 | 2 | 55  | 60  |
| 85  | 12 | 3 | 50  | 60° |
| 82  | 15 | 3 | 65  | 75° |
|     |    |   | 68  | 75° |

Room temperature tensile properties

The following results illustrate the excellent physical properties of the Pt 85%/Rh 12%/Au 3% alloy.

Ultimate tensile strength (UTS)

Fully annealed material: 62,000 lb. wt./sq. in. (10% Rh/90% Pt: 47,000 lb. wt./sq. in.)

Elongation during UTS

Fully annealed material: 16% (10% Rh/90% Pt: 35%)

0.1% proof stress

Fully annealed material: 32,000.

Hardness (Vickers pyramid number)

Fully annealed material: 145 (10% Rh/90% Pt: 80)

Electrical resistivity

The electrical resistivity of alloys embodying the invention are notably higher than that of a 10% Rh/90 Pt alloy:

Alloy:                      Electrical resistivity, ohm cm.
Pt 85%/Rh 12/Au 3% _____ $24.0 \times 10^{-6}$
Pt 90%/Rh 10% _____ $19.0 \times 10^{-6}$ It will be appreciated from the above that alloys in accordance with this invention are particularly suitable for use in the manufacture of articles for use in the glass industry such as base plates for bushings, crucibles, corrosion resistant hair springs and strip suspensions for galvanometers and for the windings of high grade potentiometers.

It is to be understood that the invention is intended to include within its scope any article such as a bushing more economical to manufacture since they are much easier to weld into containers.

It has previously been suggested to make a spinnerette for use in the manufacture of synthetic fibres such as rayon, artificial silk and artificial wool from an alloy containing 4 to 15% gold, 5 to 15% rhodium and balance base plate, crucibles, hair springs or strip suspensions for galvanometers when made of or including an alloy according to the invention.

What is claimed is:

1. A platinum-rhodium-gold alloy suitable for use in connection with molten glass, containing 12 to 25 weight percent rhodium, 1 to 3 weight percent gold and balance, apart from impurities platinum.

2. An alloy according to claim 1 containing apart from impurities 85 weight percent platinum, 12 weight percent rhodium and 3 weight percent gold.

References Cited
UNITED STATES PATENTS

| | | | |
|---|---|---|---|
| 2,384,502 | 9/1945 | Streicher | 75—172 X |
| 2,566,283 | 8/1951 | Dowson | 75—172 |
| 3,248,190 | 4—1966 | Woodward et al. | 75—172 X |

L. DEWAYNE RUTLEDGE, Primary Examiner

E. L. WEISE, Assistant Examiner

UNITED STATES PATENT OFFICE
CERTIFICATE OF CORRECTION

Patent No. 3,672,880                    Dated June 27, 1972

Inventor(s) Alan Sydney Darling and Gordon Leslie Selman

It is certified that error appears in the above-identified patent and that said Letters Patent are hereby corrected as shown below:

1. In the heading, "Johnson, Matthew & Co." (column 1) should read --Johnson, Matthey & Co.--.

2. Transpose column 4, lines 70-75 to column 3, line 1, before "platinum".

Signed and sealed this 10th day of April 1973.

(SEAL)
Attest:

EDWARD M. FLETCHER, JR.　　　　　　　ROBERT GOTTSCHALK
Attesting Officer　　　　　　　　　　Commissioner of Patents